United States Patent [19]

Alwitt

[11] 4,031,436

[45] June 21, 1977

[54] ELECTROLYTE CAPACITORS

[75] Inventor: Robert S. Alwitt, Longmeadow, Mass.

[73] Assignee: United Chemi-Con, Inc., Syracuse, N.Y.

[22] Filed: May 9, 1975

[21] Appl. No.: 576,089

[52] U.S. Cl. .............................. 361/301; 252/62.2; 361/311; 361/327

[51] Int. Cl.² ........................................ H01G 9/02

[58] Field of Search ................... 252/62.2; 317/230

[56] References Cited

UNITED STATES PATENTS

| | | | |
|---|---|---|---|
| 2,014,169 | 9/1935 | Edelman | 204/42 |
| 2,890,394 | 6/1959 | Stephenson et al. | 317/230 |
| 3,202,611 | 8/1965 | Canty et al. | 252/62.2 |
| 3,403,305 | 9/1968 | Santway et al. | 317/230 |
| 3,502,947 | 3/1970 | Hand | 252/62.2 X |

OTHER PUBLICATIONS

Maslov et al., "Chem Abstracts", vol. 77, 1972, 156919g.
Neimark et al., "Chem Abstracts", vol. 72, 1970, 137054b.

Primary Examiner—Jack Cooper
Attorney, Agent, or Firm—Schovee & Boston

[57] ABSTRACT

An electrolyte composition for electrolytic capacitors consisting essentially of a salt of a slilcotungstatic or silicomolybdic acid in a polar organic solvent and having a pH of from about 5.0 to about 7.2; and a capacitor containing said composition.

9 Claims, No Drawings

ELECTROLYTE CAPACITORS

BACKGROUND OF THE INVENTION

This invention relates to electrolytic capacitors and more particularly, to a novel electrolyte comprising salts of heteropolyacids wherein the hetero atom is silicon, of the group consisting of silicotungstic acid and silicomolybdic acid.

The prior patent to Hand, U.S. Pat. No. 3,502,947, describes a capacitor electrolyte consisting of a heteropolyacid such as phosphotungstic acid, in a suitable organic solvent, such as N-N'-dimethyl formamide, neutralized with ammonia to a pH of 7.7. Greater stability is alleged over wide temperature ranges, long shelf life and a low current leakage.

In the present invention, the use of heteropoly compounds wherein silicon is the heteropoly atom results in electrolytes having greater reliability at high temperature operation, 125° to 150° C. for example. Additionally, the electrolytes of the present invention result in capacitors having superior low temperature properties as compared to conventional electrolyte solutes, such as salts of organic acids, borates or borate complexes.

It is an object of this invention to provide a capacitor having long shelf life, superior reliability at high temperature operation and superior low temperature properties, the said capacitor having an electrolyte comprising a silicotungstate or silicomolybdate salt in an organic solvent.

A further object of the invention is to provide capacitor electrolyte as set forth above wherein the salt consists of ammonium, alkali metal, e.g. sodium, quaternary ammonium, or amine salts of the heteropolyacid, and the solvent consists of polar organic solvents.

Further objects will become apparent from the following specification and claims.

The present invention contemplates the use of a novel electrolyte in a capacitor of conventional construction. Such capacitor employs an aluminum foil anode and an aluminum foil cathode, separated by a paper spacer. After being wound into a cylindrical shape the foils and separator together with the electrolyte are sealed in a suitable container.

The novel electrolyte of this invention consists essentially of a salt of silicotungstic acid ($H_4SiW_{12}O_{40}$) or silicomolybdic acid ($H_4SiMo_{12}O_{40}$) in a polar organic solvent. The formulas set forth in the preceeding sentence give the anhydrous compositions of the acids and are written so as to reflect the structure of the heteropoly anion which consists of a central Si atom surrounded by a $W_{12}O_{40}$ (or $Mo_{12}O_{40}$) cage. The cage is made up of linked $WO_6$ (or $MoO_6$) octahedra sharing oxygen atoms.

Commercial silicotungstic acid is sold under the formula $SiO_2 \cdot 12WO_3 \cdot 26H_2O$. This has the same stoichiometry as $H_4SiW_{12}O_{40} \cdot 24H_2O$, which is a hydrated form of silicotungstic acid. Although heating could reduce the number of associated water molecules to less than 24, this would not affect the chemical behavior because the functional part of the molecule would be unchanged.

Similarly, sodium silicomolybdate is available under the formula $Na_4[SiMo_{12}O_{40}] \cdot x H_2O$, when $x$ is 10–15. For the purposes of this invention the actual value of $x$ is unimportant since the water content can be lowered if necessary by drying, or water can be added to the final electrolyte if that should be desirable.

The description of the acids as $H_2SiW_{12}O_{40}$ and $H_4SiMo_{12}O_{40}$ herein is not intended to limit them to the anhydrous form, but is to be understood as including their respective hydrated forms as well. Also, the terms "silicotungstate" and "silicomolybdate" refer to anions $[SiW_{12}O_{40}]^{-4}$ and $[SiMo_{12}O_{40}]^{-4}$ respectively, regardless of the formulas which may be employed by chemical suppliers as a result of past tradition and practice.

As salts there may be employed the alkali metals, e.g. sodium, or ammonium quaternary ammonium or amine salts, either prepared in situ in the solution, or added to the solution as such. The solvent may be any of the commonly employed polar organic solvents employed in electrolytic capacitors. Examples of suitable solvents which may be employed are dimethylformamide, N-methylformamide, butyrolactone, N-methylpyrrolidone, dimethylsulfoxide, ethylene cyanohydrin, ethylene glycol, monomethyl ether of ethylene glycol and monoethyl ether of ethylene glycol.

The invention will be further illustrated in the following examples:

EXAMPLE 1

Electrolytes were prepared as follows:

| | |
|---|---|
| Electrolyte A | |
| sodium silicomolybdate | 27 g |
| dimethylformamide | 100 g |
| Electrolyte B | |
| phosphomolybdic acid | 13 g |
| triethylamine | 1.4 ml (to give pH of 7) |
| dimethylformamide | 100 g |

Electrolyte A is an electrolyte which is an embodiment of the present invention; electrolyte B was prepared according to the teaching of the Hand U.S. Pat. No. 3,502,947.

Both solutions were kept at 125° C for 310 hours. The initial and final resistivities (measured at 25° C) were as follows:

| Electrolyte | Resistivity (ohm-cm) Initial Reading | Final Reading |
|---|---|---|
| A | 117 | 115 |
| B | 160 | 282 |

From the above test results, it is apparent that the resistivity of the silicomolybdate electrolyte was substantially unchanged whereas the prior art phosphomolybdate electrolyte underwent a 76% increase in resistivity under the same conditions.

EXAMPLE 2

Two electrolytes were prepared as follows:

| | |
|---|---|
| Electrolyte C | |
| Triethylamine silicotungstate added to dimethylformamide to make a 100 g/liter solution | |
| Electrolyte D | |
| phthalic acid | 24.9 g |
| boric acid | 1.5 g |
| triethylamine | 11.4 g |
| dimethylformamide | 100 g |
| water | 1 g |

Two sets of capacitors were assembled using 140 V etched aluminum anode foil, cathode foil, and paper spacer, all being 2.0 cm wide and 15.2 cm long. One set was impregnated with electrolyte C and the other with electrolyte D, a typical prior art electrolyte. The dissipation factors measured at various temperatures were as follows:

| Electrolyte | % Dissipation Factor Temperature | | | |
|---|---|---|---|---|
| | +25° C | −40° C | −55° C | −70° C |
| C | 3.3 | 10.5 | 13.7 | 32.2 |
| D | 2.2 | 11.6 | 21.8 | 99.1 |

It is apparent that the electrolyte of the present invention has a lower dissipation factor at low temperatures which will result in superior low temperature performance.

EXAMPLE 3

An anodic oxide film was formed on an aluminum foil coupon immersed in electrolyte C of Example 2. The current was held constant at a current density of about 0.5 ma/cm$^2$ and the temperature was about 25° C. The voltage rose smoothly at a constant rate up to 207V, at which voltage breakdown commenced. The electrolyte was then kept in a sealed container at 150° C for 545 hours. It was then cooled to room temperature and another aluminum coupon was anodically oxidized in this electrolyte at the same conditions as used initially. The voltage again rose smoothly at a constant rate to 216V at which point breakdown commenced. Thus, prolonged exposure at 150° C had no adverse effect on the oxide formation ability of this electrolyte. It was also observed that this exposure caused no change in appearance of the electrolyte nor produced any gas pressure, as might be caused by chemical decomposition, in the sealed container.

EXAMPLE 4

An electrolyte (E) was prepared consisting of 2.81 g benzyltrimethylammonium silicotungstate dissolved in 8.7 ml dimethylformamide and 9.1 ml butyrolactone. The resistivity was 429 ohm-cm. After being heated at 125° C for 16 hours and then being cooled to room temperature, the resistivity was found to be 400 ohm-cm, less than a 7% change. In this electrolyte an aluminum coupon was anodized to 198V before breakdown commenced.

EXAMPLE 5

Test results on two specific silicotungstate/dimethylformamide electrolyte solutions are as follows:

Electrolyte F = 0.06 molal solution of trimethylamine salt

Electrolyte G = 0.08 molal solution of triethylamine salt

The electrolytes were employed in test capacitors as set forth in Example 2 except that capacitors with 22 volt anode foil were used instead of the 140 volt anode foil as in Example 2. The tests were run at 150° C at a 10 volt applied load.

| Electrolyte | Hours | No. Tested | Capacitance (microfarads) | Dissipation Factor % DF | Leakage Current (microamperes) |
|---|---|---|---|---|---|
| F | 0 | 8 | 546 | 11.2 | 7.5 |
| | 572 | 8 | 506 | 10.7 | 0.4 |
| G | 0 | 8 | 547 | 12.0 | 9.4 |
| | 572 | 8 | 516 | 8.8 | 0.7 |

EXAMPLE 6

To determine the effect of water in the electrolyte on capacitor performance, a test was made on 50 V capacitors of aluminum foil anode and cathode having spacing paper therebetween. The electrolyte consisted of electrolyte F (see Example 5) containing 2% water. The capacitors were kept at 50 V at 150° C. No effect on performance was noted after 328 hours on test. Thus, a small amount of water was shown to have no adverse results.

Concentration

The concentration of the heteropolyacid salts employed in this invention may range from (1) a lower limit determined by excessively high resistivity due to dilute electrolyte and the onset of corrosion due to trace impurities, to (2) an upper limit wherein there is little further decrease in resistivity with additional increase in concentration. In the case of dimethylformamide solutions the suitable concentration limits have been found to be 0.02 to 0.20 molal and this range is satisfactory for the other polar solvents as well.

pH

In practice, the pH of the solutions have not needed any adjustment. The pH of amine salts in dimethylformamide ranges from about 5.7 to about 7.2. Aluminum oxide is not significantly attacked in the range of pH 5–7 and the heteropoly anion is more stable at low pH. Accordingly, the pH range may vary from about pH 5 to about 7.2, as measured with a glass electrode vs a conventional saturated calomel electrode as reference electrode.

What is claimed is:

1. A capacitor comprising aluminum anode and cathode members separated by an insulating spacer impregnated with an electrolyte consisting essentially of a solute of a salt of a heteropoly acid of the class consisting of silicotungstic acid and silicomolybdic acid in a polar organic solvent, said salt being selected from the group consisting of alkali metal, ammonium, quaternary ammonium and amine salts, and said electrolyte having a pH of about 5 to about 7.2, said acid containing 1 silicon atom per 12 atoms of tungsten or molybdenum.

2. The capacitor of claim 1 wherein the heteropoly acid salt has a molal concentration of about 0.02 to 0.20 in said polar solvent.

3. The capacitor of claim 2 wherein the salt is trimethylamine silicotungstate.

4. The capacitor of claim 2 wherein the salt is triethylamine silicotungstate.

5. The capacitor of claim 2 wherein the polar organic solvent is dimethylformamide.

6. The capacitor of claim 1 wherein said salt is an alkali metal salt.

7. The capacitor of claim 1 wherein said salt is a quaternary ammonium salt.

8. The capacitor of claim 1 wherein said heteropoly acid is silicotungstic acid.

9. The capacitor of claim 1, wherein said salt is an amine salt.

* * * * *